United States Patent
Han et al.

(10) Patent No.: US 7,024,058 B2
(45) Date of Patent: Apr. 4, 2006

(54) APPARATUS FOR COMPENSATING POLARIZATION MODE DISPERSION

(75) Inventors: Ki-Ho Han, Busan (KR); Wangjoo Lee, Daejon (KR); Je-Soo Ko, Daejon (KR)

(73) Assignee: Electronics and Telecommunications Research Institute, (KR)

( * ) Notice: Subject to any disclaimer, the term of this patent is extended or adjusted under 35 U.S.C. 154(b) by 0 days.

(21) Appl. No.: 10/971,979

(22) Filed: Oct. 22, 2004

(65) Prior Publication Data

US 2005/0135722 A1    Jun. 23, 2005

(30) Foreign Application Priority Data

Dec. 17, 2003  (KR) .................. 10-2003-0092673

(51) Int. Cl.
  *G02B 6/27*  (2006.01)
  *G02B 6/26*  (2006.01)
  *H04J 14/02*  (2006.01)
(52) U.S. Cl. .............. 385/11; 385/27; 398/81
(58) Field of Classification Search ............ 385/11, 385/27
See application file for complete search history.

(56) References Cited

U.S. PATENT DOCUMENTS

| | | | | |
|---|---|---|---|---|
| 5,659,412 | A * | 8/1997 | Hakki .................. | 398/152 |
| 5,930,414 | A | 7/1999 | Fishman et al. | |
| 6,678,431 | B1 * | 1/2004 | Han et al. ............. | 385/11 |
| 2002/0118422 | A1 | 8/2002 | Cao | |
| 2004/0120629 | A1 * | 6/2004 | Han et al. ............. | 385/11 |
| 2004/0202480 | A1 * | 10/2004 | Weid et al. ............ | 398/147 |
| 2004/0208604 | A1 * | 10/2004 | Madsen ................ | 398/147 |
| 2004/0234276 | A1 * | 11/2004 | Hayashi et al. ......... | 398/152 |

FOREIGN PATENT DOCUMENTS

JP    2001-251247    9/2001

OTHER PUBLICATIONS

"Planar Lightwave Circuit Polarization Mode Dispersion Compensator", European Conference on Optical Communications, 2001, vol. 1, pp 10-11.
"Polarisation mode dispersion compensation at 20 Gbit/s with fibre-based distributed equaliser", Electronics Letters, Dec. 10, 1998, vol. 34, No. 25, pp 2421-2422.

* cited by examiner

Primary Examiner—John D. Lee
Assistant Examiner—Tina M. Wong
(74) Attorney, Agent, or Firm—Blakely Sokoloff Taylor & Zafman

(57) ABSTRACT

An apparatus for compensating a polarization mode dispersion including a polarization adjusting means for adjusting polarization states of an optical beam having a differential group delay based on a polarization adjusting feedback control signal; a polarization beam splitting means for splitting principal states of polarization of the adjusted optical beam into a first polarization and a second polarization; a time delaying means for the first polarization based on a time delay feedback control signal; a polarization adjustment controlling means for controlling the polarization adjusting means based on a polarization adjusting feedback control signal; a time delay controlling means for controlling the time delaying means based on a time delay controlling feedback signal; and an electric combining means for combining a time-compensated first polarization and the second polarization transmitted through the optical tap.

8 Claims, 5 Drawing Sheets

APPARATUS FOR COMPENSATING POLARIZATION MODE DISPERSION

FIELD OF THE INVENTION

The present invention relates to an optical transmission system; and, in particular, to an apparatus for automatically and adaptively compensating polarization mode dispersion (PMD) in real time.

DESCRIPTION OF RELATED ART

A polarization mode dispersion (PMD) occurs by an optical fiber birefringence and a random polarization coupling in an optical fiber link. The PMD is a phenomenon that an optical signal pulse is dispersed due to differential group delay induced between principal states of polarization (PSP) of an optical signal because of a fiber birefringence when the optical signal is propagated through an optical fiber. The effect caused by the PMD is increased as a transmission rate per a channel and a transmission distance increase. Also, the PMD is varied according to time and the variation of the PMD is random and statistical.

There has been various conventional compensator introduced for automatically compensating the PMD in real time.

An optical compensator is proposed in an article, by T. Saida. et al, entitled "Planar lightwave circuit polarization mode dispersion compensator", European Conference on Optical Communications (ECOC), vol 1, pp10–11, 2001. The optical compensator is manufactured as a planar lightwave circuit (PLC) integrated type based on silica, and compensates the PMD by using a Mach-Zehnder interferometer. The optical compensator can be manufactured in a small size so that can be built in a receiver. However, the optical compensator may generate insertion loss in a case that delayed two signals in PSP are not perfectly divided and compensated. Also, the optical compensator takes long time for compensating the PMD since the optical compensator alternately controls the Mach-Zender interferometer and a delay line in response to one feedback signal.

Meanwhile, there is another conventional compensator proposed in an article, by R. Noe. et al, entitled "Polarization mode dispersion compensation at 20 Gbit/s with fiber-based distributed equalizer", Electronics Letter, vol. 14, pp. 2421–2422, Oct. 10, 1998. The conventional compensator eliminates the PMD by controlling a plurality of polarization converters. However, the compensator has drawbacks that the compensation takes a long time for adjusting multiple polarization converters and control of time delay is not continuous.

Meanwhile, still another conventional compensator is in U.S. Pat. No. 5,930,414 issued to D. A. Fishman entitled "Method and apparatus for automatic compensation of first-order polarization mode dispersion", Jul. 17, 1999. The compensator integrates electric spectrum of compensator's output and alternately controls an optical delay line and a polarization converter by using one controller based on the integrated value. However, the compensator also monitors one feedback signal of one controller and alternately controls a polarization converter and a delay line. Thus, there is a drawback that the compensation takes a long time relatively and moreover, because of an optical delay line operated by a motor, it takes much more time.

SUMMARY OF THE INVENTION

It is, therefore, one object of the present invention to provide an apparatus for automatically and adaptively compensating a polarization mode dispersion (PMD) in real time, by independently controlling principal states of polarization (PSP) and a differential group delay (DGD) based on two different feedback signals so that the apparatus saves PMD compensation time for a high speed optical transmission system.

It is another object of the present invention to provide an apparatus for automatically and adaptively compensating the PMD in real-time by not only independently controlling the PSP and the DGD but also using an electrical DGD controlling method instead of using an optical DGD control in order to save the PMD compensation time.

In accordance with an aspect of the present invention, there is provided an apparatus for compensating polarization mode dispersion (PMD), the apparatus including: a polarization adjusting unit for adjusting polarization states of an optical beam having a differential group delay (DGD), into a predetermined polarization states based on a polarization adjusting feedback control signal; a polarization beam splitting unit for splitting principal states of polarization (PSP) of the adjusted optical beam from the polarization adjusting unit into a first polarization and a second polarization and transmitting the first polarization and the second polarization through a first routine and a second routine, respectively; a time delaying unit for the first polarization based on a time delay feedback control signal; a polarization adjustment controlling unit for controlling the polarization adjusting unit based on a polarization adjusting feedback control signal in order to converge electric power into a minimum value by measuring the electric power of tapped electric signal and comparing current value with previous value of the electric power, wherein the tapped electric signal is photo-electrically converted from the second polarization tapped by an optical tap; a time delay controlling unit for controlling the time delaying unit based on a time delay controlling feedback signal so that electric power is converged into a maximum value by measuring the electric power of a combined electric signal and comparing current value with previous value of the electric power, wherein the combined electric signal is combined after photo-electrically converting the first polarization and the second polarization; and an electric combining unit for combining a time-compensated first polarization and the second polarization transmitted through the optical tap.

In accordance with another aspect of the present invention, there is provided an apparatus including the time delaying unit that electrically delays the first polarization according to the time delay feedback control signal.

In accordance with another aspect of the present invention, there is provided an apparatus for compensating a polarization mode dispersion (PMD), the apparatus including: a polarization adjuster for adjusting polarization states of an optical beam inputted through a transmission optical link; a polarization beam splitter for splitting principal states of polarization of the adjusted optical beam to a first polarization and a second polarization and transmitting a first polarization through a first routine and the second polarization to a second routine; a first photo detector for converting the first polarization into an electric signal; an optical tap for tapping a part of the second polarization and passing the remained part of the second polarization; a second photo detector for converting the remained second polarization into an electric signal; a third photo detector for converting the tapped signal into an electric signal; a first band pass filter for filtering the electric signal; a first radio frequency detector for detecting electric power of the filtered signal; a polarization adjuster controller for controlling the polarization adjuster based on the electric power detected from the first radio frequency detector; an electric delay line for providing a time delay in the electric signal converted by the first photo detector; an electric combiner for combining the time-delayed signal from the EDL and the electric signal from the second photo detector; an electric divider for tapping the combined signal from the electric combiner; a second band pass filer for filtering a specific frequency of the tapped signal from the electric divider; a second radio frequency detector for detecting electric power of the band passed signal from the second band pass filer; and an EDL controller for controlling the electric delay line based on the detected signal from the second radio frequency detector.

BRIEF DESCRIPTION OF THE DRAWINGS

The above and other objects and features of the present invention will become better understood with regard to the following description of the preferred embodiments given in conjunction with the accompanying drawings, in which.

DETAILED DESCRIPTION OF THE INVENTION

Hereinafter, an apparatus for automatically and adaptively compensating polarization mode dispersion (PMD) in real time will be described in detail with reference to the accompanying drawings.

Figure 1:
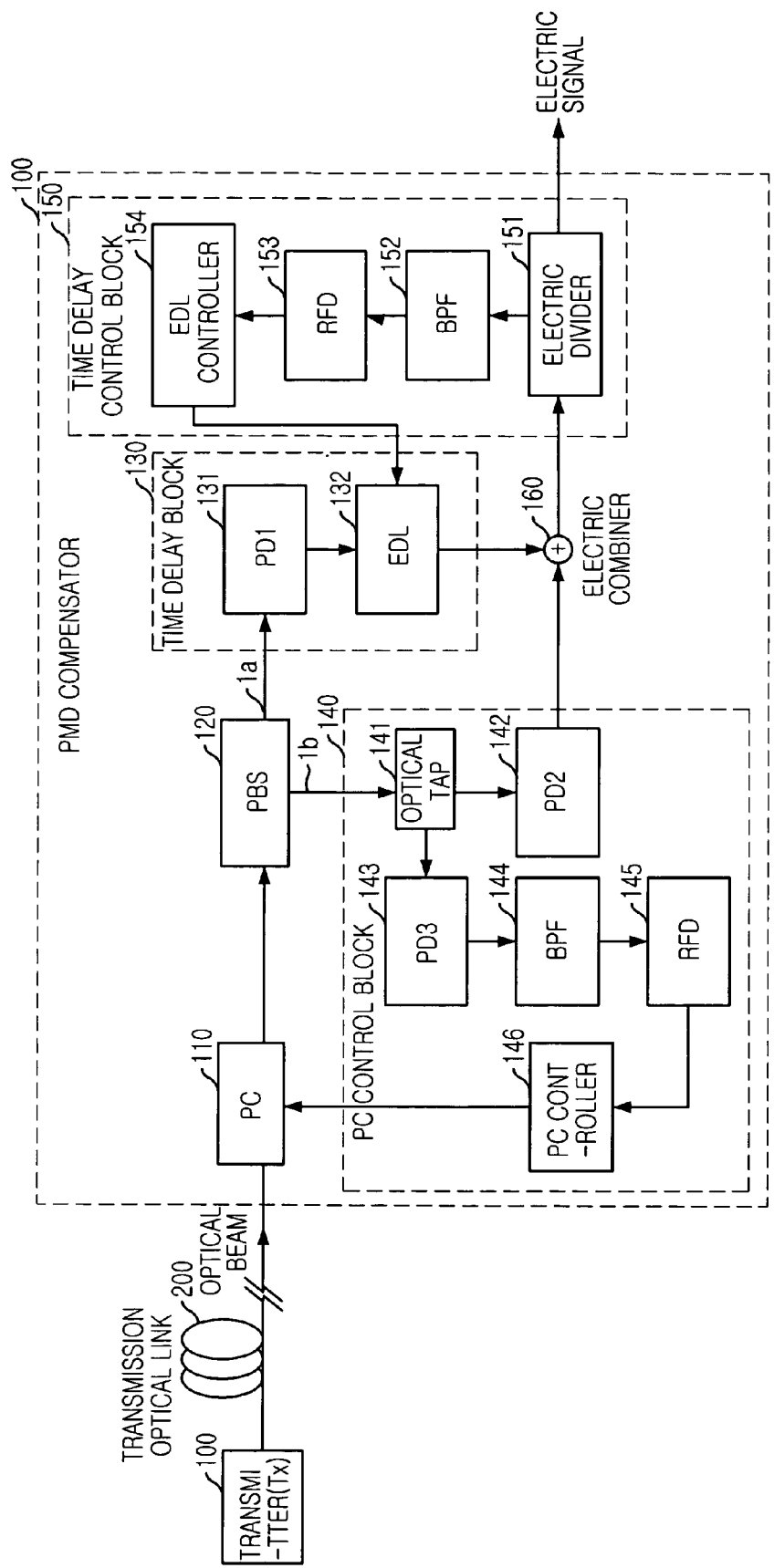
FIG. 1 is a block diagram showing an apparatus for automatically and adaptively compensating polarization mode dispersion (PMD) in accordance with a preferred embodiment of the present invention.

FIG. 1 is a block diagram showing an apparatus for automatically and adaptively compensating a PMD in real time in accordance with a preferred embodiment of the present invention.

As shown, a PMD compensator 100 includes a polarization controller (PC) 110, a polarization beam splitter (PBS) 120, a time delay block 130, a PC control block 140, a time delay control block 150 and an electrical combiner 160.

The PC 110 adjusts principal states of polarization (PSP) of an optical beam having differential group delay (DGD) into predetermined polarization state based on a PC feedback control signal provided by the PC control block 140. The DGD is caused when the optical beam is propagated through a transmission optical link B. That is, the PC 110 generates an adjusted optical beam by adjusting PSP of optical beam to the predetermined polarization state.

The PBS 120 receives the adjusted optical beam and splits the PSP of the adjusted optical beam into a first polarization state and a second polarization state. In other word, the PBS 120 generates a first optical beam having the first polarization state (hereinafter refer to a first polarization beam) and a second optical beam having the second polarization state (hereinafter refer to a second polarization beam). The PBS 120 transmits the fist polarization beam to the time delay block 130 through a first routine (1a) and transmits the second polarization beam to the PC control block 140 through a second routine (1b).

The time delay block 130 receives the first polarization beam and photo-electrically converts the first polarization beam into a first polarization signal. The time delay block 130 delays the first polarization signal during a predetermined time according to a time delay feedback control signal from the time delay control block 150. The time delay block 130 generates a time delayed first polarization signal.

The PC control block 140 receives the second polarization beam and taps a part of the second polarization beam into a tapped second polarization beam and a remained second polarization. The remained second polarization beam is photo-electrically converted into a second polarization signal. The PC control block 140 generates a PC control feedback signal that makes electric power of the second polarization beam to be converged into a minimum value. The PC control block 140 controls the PC 110 by providing the PC control feedback signal.

The electrical combiner 160 generates an electric signal by combining the time-delayed first polarization signal and the second polarization signal.

The time delay block 130 includes a first photo detector (PD) 131 and an electric delay line (EDL) 132.

The first PD 131 receives the first polarization beam and photo-electrically converts the first polarization beam into an electric signal as the first polarization signal. The EDL 132 receives the first polarization signal and electrically delays the first polarization signal based on an electrical DGD controlling method for a high-speed DGD control.

The PC control block 140 includes an optical tap 141, a second PD 142, a third PD 143, a first band pass filter (BPF) 144, a first radio frequency detector (RFD) 145 and a PC controller 146.

The optical tap 141 taps a part of the second polarization beam for generating a tapped second polarization beam and a remained second polarization beam and transmits the tapped second polarization beam to the third PD 143. The optical tap 141 transmits the remained second polarization beam to the second PD 142.

The second PD 142 receives the remained second polarization beam and photo-electrically converts the remained second polarization beam into an electric signal as a second polarization signal.

The third PD 143 receives the tapped second polarization beam and converts the tapped second polarization beam into an electric signal as a tapped second polarization signal.

The first BPF 144 receives the tapped second polarization signal and filters a predetermined frequency of the tapped second polarization signal and thereby generates a band passed second polarization signal.

The first RFD 145 receives the band passed second polarization signal and detects electric power of the band passed second polarization signal.

The PC controller 146 receives the electric power and compares a current electric power with the previous electric power, and generates a PC feedback control signal. The PC controller 146 controls PC 110 such that the axes of the PSP of the optical beam fit to predetermined axes of the PBS 120. Ideally, at the end of the feedback control of the PC 110, the PBS 120 splits the two orthogonal PSPs of the optical beam into a vertical polarization state and a horizontal polarization state.

The time delay control block 150 includes an electric divider 151, a second BPF 152, a second RFD 153 and an EDL controller 154.

The electric divider 151 taps a part of the combined polarization signal to generate a tapped signal. The tapped signal is transmitted to the second BPF 152. The remained combined polarization signal is transmitted as an electric output signal.

The second BPF 152 receives the tapped signal and filters a predetermined frequency of the tapped signal and thereby generates a band passed signal.

The second RFD 153 receives the band passed signal and detects a level of electric power of the band passed signal.

The EDL controller 154 receives the level of electric power and controls EDL in such a way to selects a large one of a currently level of electric power and the previous level of electric power, and thereby generates a time delay feedback control signal based on the comparison result of electric power. Ideally, at the end of the feedback control of the time delay block 130, a total DGD becomes '0'. That is, the PMD is compensated.

Operations of the above-mentioned PMD compensator are described as follows.

A transmitter (Tx) transmits an optical beam through a transmission link to a PMD compensator 100.

While the optical beam is propagated through the transmission optical link, the optical signal experiences DGD and as a result becomes distorted.

The PMD compensator 100 receives the PSP distorted optical beam from the transmitter (Tx).

The PC 110 receives the PMD distorted optical beam and adjusts the PSP of the received optical beam for aligning them to the axes of the PBS 120.

The PBS 120 transmits a first optical beam having the first polarization state (hereinafter a first polarization beam) to the first PD through the first routine (1a). The first polarization beam is converted into an electric signal at the first PD and the electric signal is delayed at the EDL 132. The time delayed electric signal is transmitted to the electrical combiner 160.

At the PBS 120, a second optical beam having the second polarization state (hereinafter a second polarization beam) is transmitted to the optical tap 141 through the second routine (1b). A part of the second polarization beam is tapped at the optical tap 141 and photo-electrically converted into an electric signal as a tapped second polarization signal at the third PD 143. The remained of the second polarization beam is photo-electrically converted into an electric signal as a second polarization signal at the second PD 142 and transmitted to the electric combiner 160. The tapped second polarization signal is filtered at the first BFP 144. Then, the first RFD 145 detects a level of electric power of the band passed signal and transmits the detected level of the electric power to the PC controller 146. The PC controller 146 compares current level of the electric power with the previous level of the electric power and controls the PC 110 repeatedly based on a PC feedback control signal in order to select a minimum value of the electric power. Therefore, the PC controller 146 performs the electric power comparison function of the current one with the previous one, and the feedback control function for the PC 110.

Meanwhile, the time delayed polarization signal and the second polarization signal are combined at the electrical combiner 160 as a combined signal and a part of the combined signal is tapped at the electric divider 151 and the tapped signal is transmitted to the second BPF 152. The remained combined signal is outputted as the electric output signal. The tapped signal is filtered at the second BFP 152 and the level of the electric power of the filtered signal is detected at the second RFD 153. Then, the EDL controller 154 compares the detected level of the electric power by the second RFD 153 with the previous one and repeatedly controls the EDL 132 based on the EDL feedback signal in order to select a maximum value of the electric power. Therefore, the EDL controller 154 performs the electric power comparison function of the current one with the previous one, and the feedback control function for the EDL 132.

The distorted signal due to the PMD is compensated by independently controlling the PC controller 146 and the EDL controller 154 based on the PC feedback control signal and the EDL feedback respectively, and finally the compensated signal is outputted from the PMD compensator 100 as an electric output signal.

The detail theory for compensating the PMD is described hereinafter.

The optical beam transmitted from a transceiver is propagated through a transmission optical link and is delayed during propagating as much as DGD. The DGD is generated between principle states of polarization of the optical beam. The delayed optical beam is propagated through the PC 110 for adjusting the PSP of the optical beam and the optical tap 141 for tapping the adjusted optical beam. The taped optical beam is inputted to the third PD 143 and the third PD 143 photo-electrically converts the tapped optical beam into an electric signal. The electric signal is expressed as:

$$S(\omega) \propto I_o^2 \left\{ \begin{array}{l} (a^4 + b^4 + 2a^2b^2\cos\omega\tau_f)|F(\omega)|^2 + \\ 4a^2b^2|H(\omega)|^2\cos^2\omega_o\tau_f \\ -4ab\cos\omega_o\tau_f \cdot \mathrm{Re}[(a^2\exp(i\omega\tau_f) + b^2)F(\omega)H*(\omega)] \end{array} \right\} \quad \text{Eq. (1)}$$

Wherein, $F(\omega)$ is a Fourier transform of $\cos^2(\Delta\phi(t)/2)$. $H(\omega)$ is a Fourier transform of $\cos(\Delta\phi(t+\tau)/2)\cos(\Delta\phi(t)/2)$, $\alpha$ is $\cos\theta_o \cos\theta$, and b is $\sin\theta_o \sin\theta$; $\Delta\phi(t)$ expressed as $\pi[1-f(t)]$ is a phase difference between two waveguides of external modulator, $\omega_o$ is an optical frequency, $\theta_o$ is an angle between signal polarization launched into fiber optical link and one principal state (PSP+) of the transmission optical link, $\theta$ is an angle between the PSP+ of the optical beam outputted from the transmission optical link and one polarization axis in the PBS 120, i.e., x-axis, $I_o$ is an intensity of the optical beam from the transmitter (Tx) A and $\omega$ is expressed as $2\pi f$. Assume that the transmission optical link has no loss.

Generally, an envelope of $F(\omega)$ presents a sinc function when a pseudo random bit sequence (PRBS) non return to zero (NRZ) data pulse signal is applied to the $F(\omega)$ and a value of $F(\omega)$ becomes 0 when f=n/T, (n=1, 2, 3, . . . ). $S(\omega)$ is a function of $\theta$ and is converged into a minimum value at $\theta=n\pi/2$, (n=0, 1, 2, . . . ). The two PSPs are independently split into the PSP+ and the PSP− by aligning to the axes of the PSB 120. For splitting the PSP, a feedback process is required. The feedback process includes process of comparing current value of $S(\omega)$ with the previous one and providing a PC feedback control signal to the PC 110 in order to select a smaller value.

It is assumed that arbitrary 10 Gb/s NRZ data pulse f(t) is 01011100101100 over a given time window of $-7T \leq t \leq 7T$ for a concrete calculation of $S(\omega)$.

Figure 2:
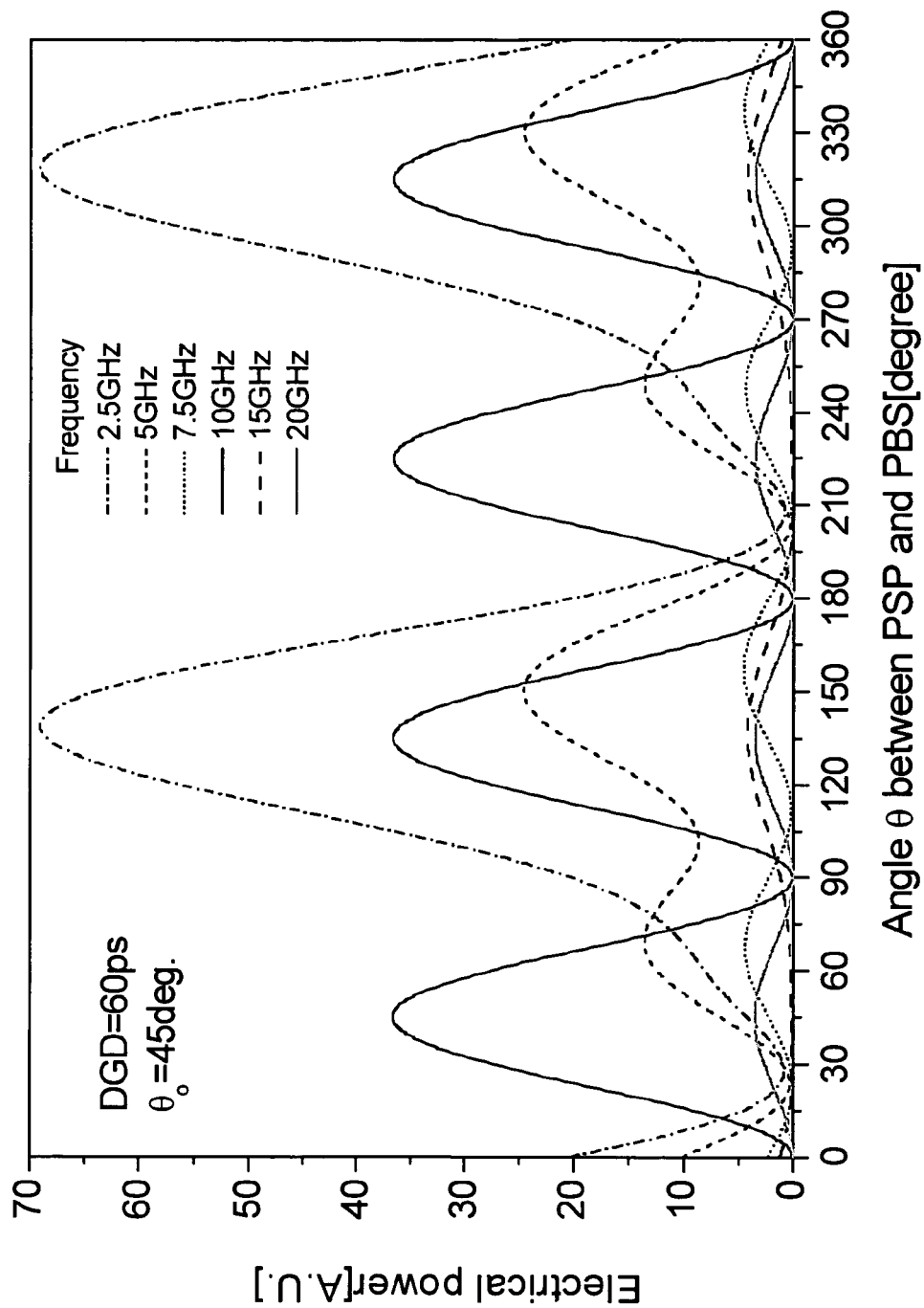
FIG. 2 is a graph illustrating variations of electric power according to an angle between one polarization state of principal states of polarization (PSP) axis and one of a polarization Beam Splitter (PBS) axes in accordance with a preferred embodiment of the present invention.

FIG. 2 is a graph showing variations of electric power as a function of $\theta$ for fixed constants of $\theta_o = \pi/4$ and $\pi_f = 60$ ps while varying monitoring frequency.

Referring to FIG. 2, at the frequencies except 10 GHz and 20 GHZ, the PSP cannot be spilt into the PSP+ and the PSP-. In other words, $S(\omega)$ is not converged at $\theta = n\pi/2$, (n=0, 1, 2, . . . ).

When the f(t) is a RZ data pulse signal having a bit period as 0.5, the monitoring frequencies for tracing the PSP is f=2n/T, (n=1, 2, 3, . . . ). The real-time PSP tracing method can constantly maintain that the two PSPs are separated even under time-varying PMD environment.

Meanwhile, the electric signal combined by the electrical combiner 160 is tapped at the electric divider 151 and the tapped electric spectrum expressed as:

$$Q(\omega) \propto L_o^2 [1-\sin^2 2\theta_o \sin^2(\omega\tau/2)] \cdot |F(\omega)|^2 \qquad \text{Eq. 2}$$

Wherein, $\tau$ is a sum of the DGD $\tau_f$ of fiber link and the DGD $\tau_c$ generated from the PMD compensator 100, i.e., a total DGD.

Figure 3:
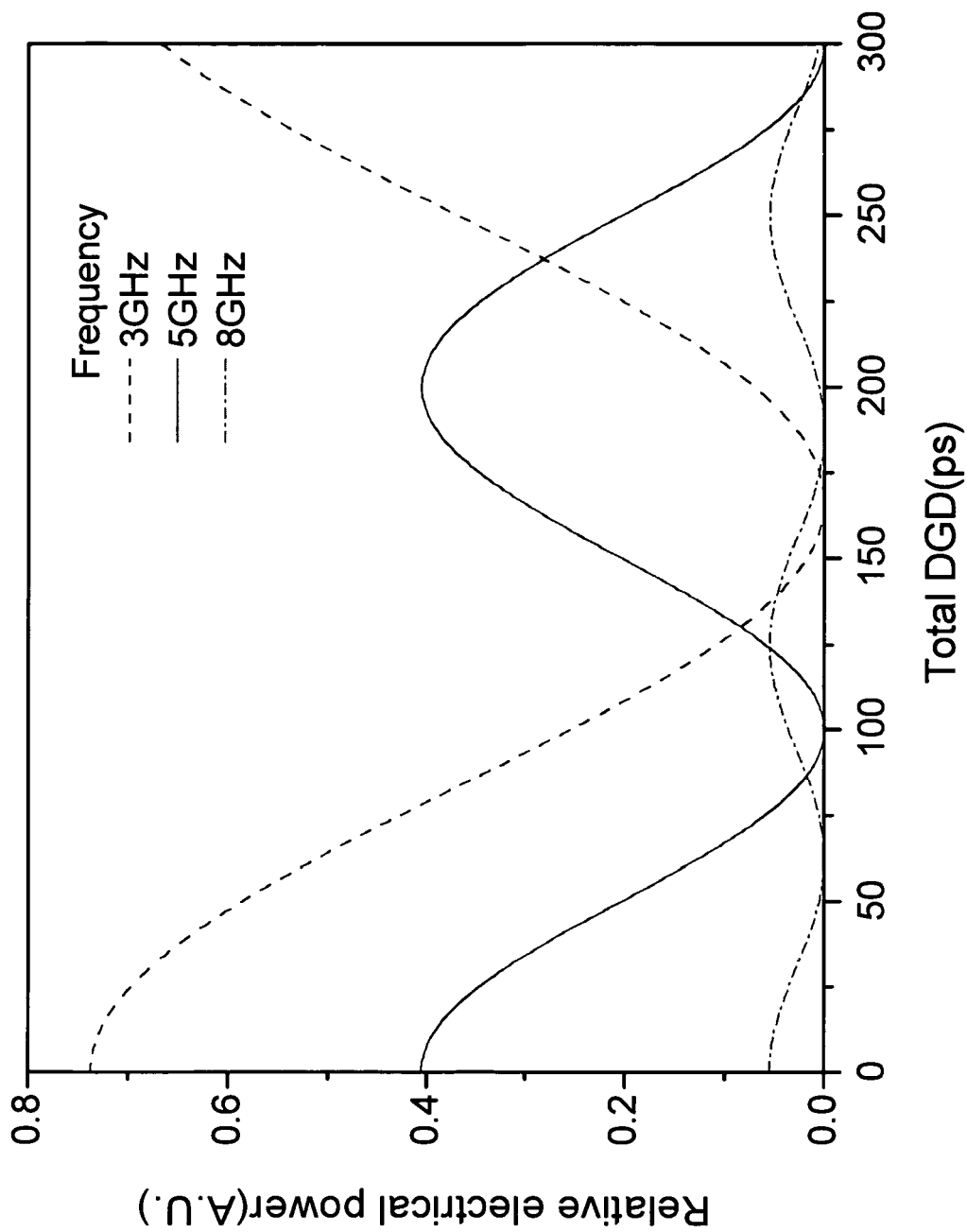
FIG. 3 is a graph illustrating electric power variation according to Differential Group Dispersion (DGD) in accordance with a preferred embodiment of the present invention.

FIG. 3 is a graph illustrating variation of an electric power $Q(\omega)$ of monitoring frequencies as a function of DGD $\tau$.

For compensating the distorted signal, the total DGD $\tau$ must become '0'. Accordingly, the EDL controller 154 compares current value with the previous value of electric power $Q(\omega)$ at a specific frequency and provides the EDL feedback control signal to the EDL 132 in order to select a larger value. By repeating of the feedback process, $Q(\omega)$ has a maximum value and total DGD $\tau$ becomes '0'. Therefore, the distorted signal is compensated.

In FIG. 3, it must seriously consider that $Q(\omega)$ also becomes a maximum value at $\tau = n/f$, (n=1, 2, 3, . . . ) as at $\tau = 0$. Thus when the frequency is 5 GHz, $Q(\omega)$ has a maximum value at $\tau = 200$ and can show maximum convergence according to the tracing process. Therefore, if the monitoring frequency is 5 GHz, the total DGD is limited under 100 ps in order to prevent a vague signal.

The range of the total DGD $\tau$ is varied according to the monitoring frequency. As shown in FIG. 1, if the monitoring frequency is decreased, the range of the DGD $\tau$ is increased. If the monitoring frequency is $f = n/\tau$, (n=1, 2, 3, . . . ), $Q(\omega)$ always has a constant value and DGD cannot be traced. Thus, the frequency as above is prohibited.

Figure 4:
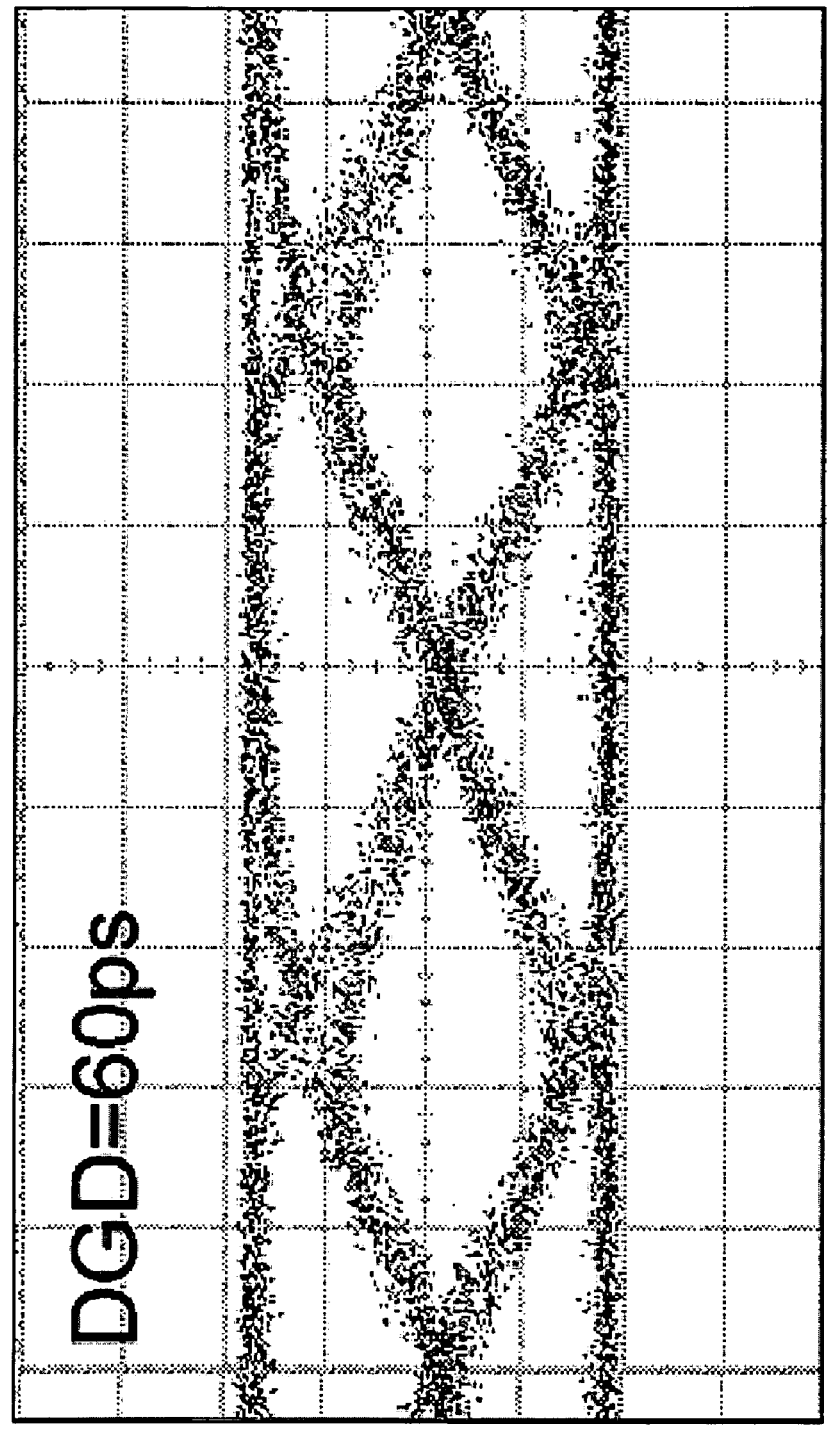
FIG. 4 is an eye diagram describing a distorted signal when DGD is 60 ps.

FIG. 4 is an eye diagram showing a distorted signal when 60 ps of DGD is artificially provided to the signal by using a PMD emulator. The eye diagram shows considerably closed eyes due to the PMD. Thus, the eye margin is decreased.

Figure 5:
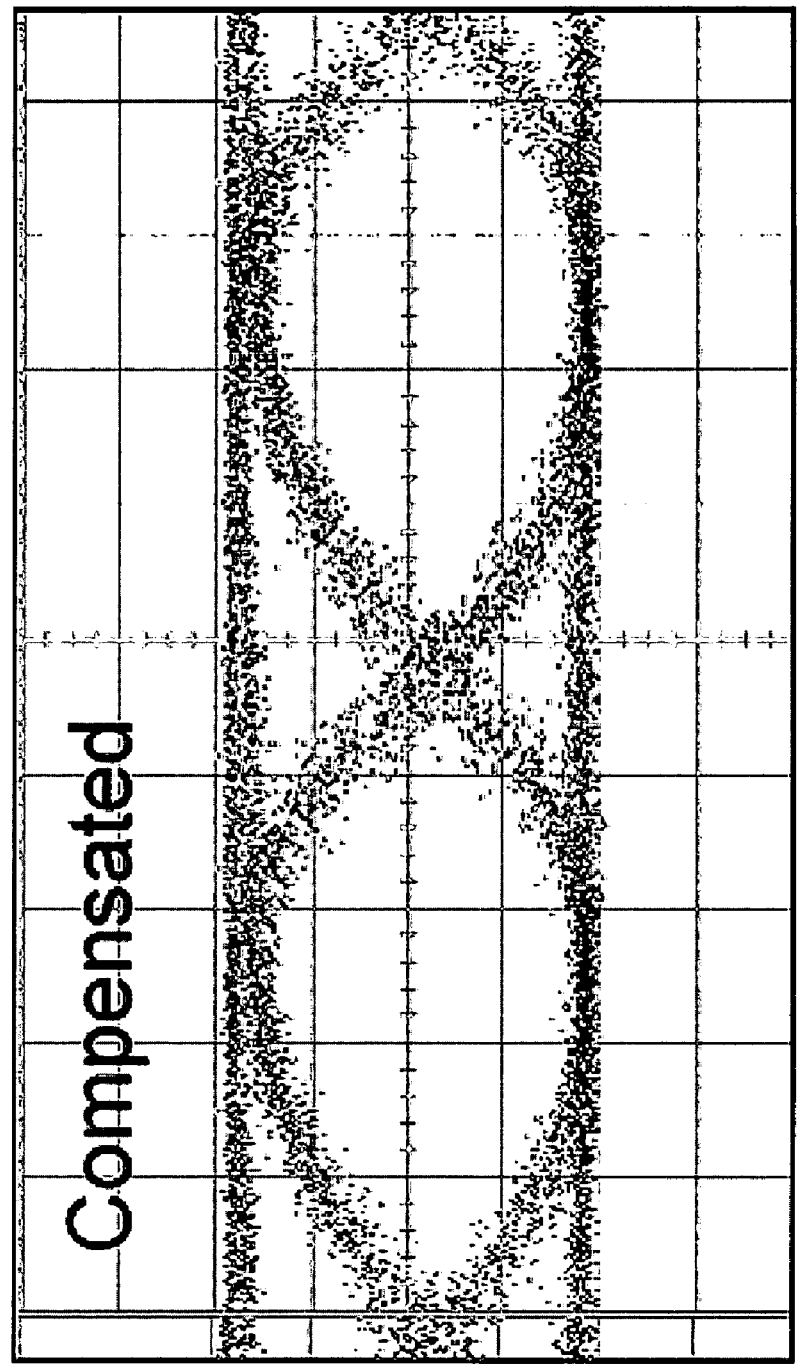
FIG. 5 is an eye diagram showing a PMD compensated signal in accordance with a preferred embodiment of the present invention.

FIG. 5 is an eye diagram showing a PMD compensated signal in FIG. 4. As shown, when the PMD is compensated, the eye is restored to have considerably opened eyes and the eye margin is increased.

The present invention provides more accurate and faster PMD compensation by independently controlling the PSP and the DGD, and saves the compensation time remarkably by controlling the DGD electrically.

Therefore, the present invention independently controls the PSP and the DGD and speeds up the compensation time up to MHz speed by electrically controlling the DGD.

The present application contains subject matter related to Korean patent application No. 2003-92673, filed in the Korean intellectual Property Office on Dec. 17, 2003, the entire contents of which being incorporated herein by reference.

While the present invention has been described with respect to certain preferred embodiments, it will be apparent to those skilled in the art that various changes and modifications may be made without departing from the scope of the invention as defined in the following claims.

What is claimed is:

1. An apparatus for compensating polarization mode dispersion (PMD), the apparatus comprising:

a polarization adjusting means for adjusting polarization states of an optical beam having a differential group delay (DGD) into a predetermined polarization states based on a polarization adjusting feedback control signal;

a polarization beam splitting means for splitting principal states of polarization (PSP) of the adjusted optical beam from the polarization adjusting means into a first polarization and a second polarization and transmitting the first polarization and the second polarization through a first routine and a second routine, respectively;

a time delaying means for delaying the first polarization based on a time delay feedback control signal;

a polarization adjustment controlling means for controlling the polarization adjusting means based on a polarization adjusting feedback control signal in order to converge electric power into a minimum value by measuring the electric power of tapped electric signal and comparing current value with previous value of the electric power, wherein the tapped electric signal is photo-electrically converted from the second polarization tapped by an optical tap;

a time delay controlling means for controlling the time delaying means based on a time delay controlling feedback signal so that electric power is converged into a maximum value by measuring the electric power of a combined electric signal and comparing current value with previous value of the electric power, wherein the combined electric signal is combined after photo-electrically converting the first polarization and the second polarization; and an electric combining means for combining a time-compensated first polarization and the second polarization transmitted through the optical tap.

2. The apparatus as recited in claim 1, wherein the time delaying means electrically delays the first polarization according to the time delay feedback control signal.

3. The apparatus as recited in claim 2, wherein the time delaying means includes:

a first photo detector for converting the first polarization into an electric signal; and an electric delay line for delaying the electric signal.

4. The apparatus as recited in claim 1, wherein the polarization adjustment controlling means compares the current electric power with the previous electric power and provides the polarization adjusting feedback control signal to the polarization adjusting means and splitting the PSP by alignment to two axes of the polarization beam splitting means.

5. The apparatus as recited in claim 1, wherein the time delay controlling means compares the current electric power with the previous electric power and provides the time delay feedback control signal to the time delaying means, and thereby compensating the PMD by converging a total DGD to "0".

6. The apparatus as recited in claim 1, the polarization adjustment controlling means includes:

an optical tap for tapping a part of the second polarization and passing a remained part of the second polarization;

a second photo detector for converting the remained part of second polarization into an electric signal;

a third photo detector for converting the tapped polarization into an electric signal;

a first band pass filter for filtering a the electric signal from the third photo detector;

a first radio frequency detector for detecting electric power of the filtered signal from the first band pass filter; and a polarization adjustment controller for controlling the polarization adjusting means based on the electric power detected by the first radio frequency detector.

7. The apparatus as recited in claim 5, wherein the time delay controlling means includes:

an electric divider for tapping the combined electric signal from the electric combiner;

a second band pass filter for filtering the tapped signal;

a second radio frequency detector for detecting electric power of the band-passed signal from the second band pass filter; and an electric delay line controller for controlling the EDL based on the detected signal from the second radio frequency detector.

8. An apparatus for compensating a polarization mode dispersion (PMD), the apparatus comprising:

a polarization adjuster for adjusting polarization states of an optical beam inputted through a transmission optical link;

a polarization beam splitter for splitting principal states of polarization of the adjusted optical beam to a first polarization and a second polarization and transmitting a first polarization through a first routine and the second polarization to a second routine;

a first photo detector for converting the first polarization into an electric signal;

an optical tap for tapping a part of the second polarization and passing the remained part of the second polarization;

a second photo detector for converting the remained second polarization into an electric signal;

a third photo detector for converting the tapped signal into an electric signal;

a first band pass filter for filtering the electric signal;

a first radio frequency detector for detecting electric power of the filtered signal;

a polarization adjuster controller for controlling the polarization adjuster based on the electric power detected from the first radio frequency detector;

an electric delay line for providing a time delay in the electric signal converted by the first photo detector;

an electric combiner for combining the time-delayed signal from the EDL and the electric signal from the second photo detector;

an electric divider for tapping the combined signal from the electric combiner;

a second band pass filter for filtering a specific frequency of the tapped signal from the electric divider;

a second radio frequency detector for detecting electric power of the band passed signal from the second band pass filer; and an EDL controller for controlling the electric delay line based on the detected signal from the second radio frequency detector.

* * * * *